(12) United States Patent
Tsai et al.

(10) Patent No.: US 8,117,715 B2
(45) Date of Patent: Feb. 21, 2012

(54) STRUCTURE OF CASTER

(75) Inventors: Li-Chun Tsai, Taipei (TW); Huei-Ling Liao, Taipei (TW)

(73) Assignee: Everglide Caster Corp., Taipei (TW)

( * ) Notice: Subject to any disclaimer, the term of this patent is extended or adjusted under 35 U.S.C. 154(b) by 108 days.

(21) Appl. No.: 12/790,846

(22) Filed: May 30, 2010

(65) Prior Publication Data

US 2011/0289729 A1    Dec. 1, 2011

(51) Int. Cl.
*B60B 33/00* (2006.01)

(52) U.S. Cl. ...................................... 16/35 R; 188/1.12
(58) Field of Classification Search .................. 16/18 R, 16/45, 35 R, 35 D; 188/1.12, 69
See application file for complete search history.

(56) References Cited

U.S. PATENT DOCUMENTS

| | | | | |
|---|---|---|---|---|
| 3,571,842 A | * | 3/1971 | Fricke | 16/35 R |
| 3,890,669 A | * | 6/1975 | Reinhards | 16/35 R |
| 3,988,800 A | * | 11/1976 | Sachser | 16/35 R |
| 4,080,809 A | * | 3/1978 | Ross | 68/12.01 |
| 4,248,445 A | * | 2/1981 | Vassar | 280/79.11 |
| 4,479,566 A | * | 10/1984 | Ishii | 188/1.12 |
| 5,181,587 A | * | 1/1993 | Masatoshi | 188/1.12 |
| 5,232,071 A | * | 8/1993 | Kawanabe | 188/1.12 |
| 6,619,438 B1 | * | 9/2003 | Yang | 188/1.12 |
| 6,810,560 B1 | * | 11/2004 | Tsai | 16/35 R |

* cited by examiner

*Primary Examiner* — William L. Miller
(74) *Attorney, Agent, or Firm* — Leong C. Lei

(57) ABSTRACT

A caster includes a base carrying a rotation shaft and forming a pivotal joint seat. Wheels are rotatably mounted to the rotation shaft. Each wheel has an inside surface that is recessed to form an inner rim. A brake arm has a first end rotatably coupled to the pivotal joint seat and a second end forming a brake pawl extending into the inner rims of the wheels. A spring is arranged between the brake arm and the base so that the spring normally biases the brake pawl to depress against the inner rims of the wheels to brake the wheels. A release knob is rotatably mounted to the base and forms a cam section positionable against the brake arm. The cam section, when rotated by the release knob, drives the brake arm backward to release the brake pawl from the wheels, allowing the wheels to freely rotate.

7 Claims, 5 Drawing Sheets

STRUCTURE OF CASTER

TECHNICAL FIELD OF THE INVENTION

The present invention generally relates to a structure of caster, and more particularly to a caster that is operated by rotating a release knob for locking or releasing.

DESCRIPTION OF THE PRIOR ART

Furniture or objects, such as chairs, shelves, chests, and carts, are often provided at the bottom thereof with casters, which often comprises a base that supports a wheel. The base is also provided with a rotatable brake member, whereby rotating the brake member up and down allows the wheel to be released and locked respectively.

The conventional caster, once locked through depressing the brake member, is susceptible to unexpected release due to the fact that a reaction force that the wheel applies to the brake member is in the direction in which a force that intends to release the wheel may act and once this happens, the braking fails and the object (such as a cart or a chair) to which the caster is mounted may slide away unexpectedly, leading to potential risk of danger.

Further, the conventional caster uses a brake member that comprises an elongate, projecting operation bar for being operated by a user. Such an elongate operation bar often project quite a distance from the caster, making it looked striking and also easy to entangle an external object or to causing stumble of a passing individual or a user.

It is thus desired to provide an improved structure of caster that overcomes the above problems.

SUMMARY OF THE INVENTION

An objective of the present invention is to provide a structure of caster, which comprises a base, to which a rotation shaft is mounted. The base also forms a pivotal joint seat. Wheels are rotatably mounted to the rotation shaft of the base. Each of the wheels has an inside surface that is recessed to form an inner rim. A brake arm has a first end rotatably coupled to the pivotal joint seat of the base and a second end that forms a brake pawl extending into the inner rims of the wheels. A spring is arranged between the brake arm and the base in such a way that the spring normally biases the brake pawl formed on the second end of the brake arm to depress against the inner rims of the wheels to brake the wheels. A release knob is rotatably mounted to the base and comprises a cam section, which is positioned against the brake arm, whereby the cam section, when rotated by the release knob, drives the second end of the brake arm backward to release the brake pawl of the brake arm from the wheels, allowing the wheels to freely rotate.

The caster of the present invention is applicable to a chair, a chest, a shelf, or a cart.

According to the caster of the present invention, the inner rim of each wheel has an inside surface that forms a plurality of troughs and the brake pawl of the brake arm forms teeth corresponding to the troughs, so that the teeth of the brake arm are engageable with the troughs of the wheel to arrest rotation of the wheel.

The features of structure of the caster according to the present invention are that through rotation of the release knob, the brake arm is caused to backward retract, so that the brake arm no longer brakes the wheels, or the rotation of the release knob releases the brake arm to allow the brake arm to be biased by a spring to resiliently position against the wheels and thus brake rotation of the wheels. According to the present invention, whether the wheels are arrested is determined by the rotation of the release knob, and thus, the operation is simple and also effortless. Further, undesired release of the wheels caused by external forces, improper handling and treading, or entangling external objects, which leads to unexpected movement of the caster, can be effectively avoided.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
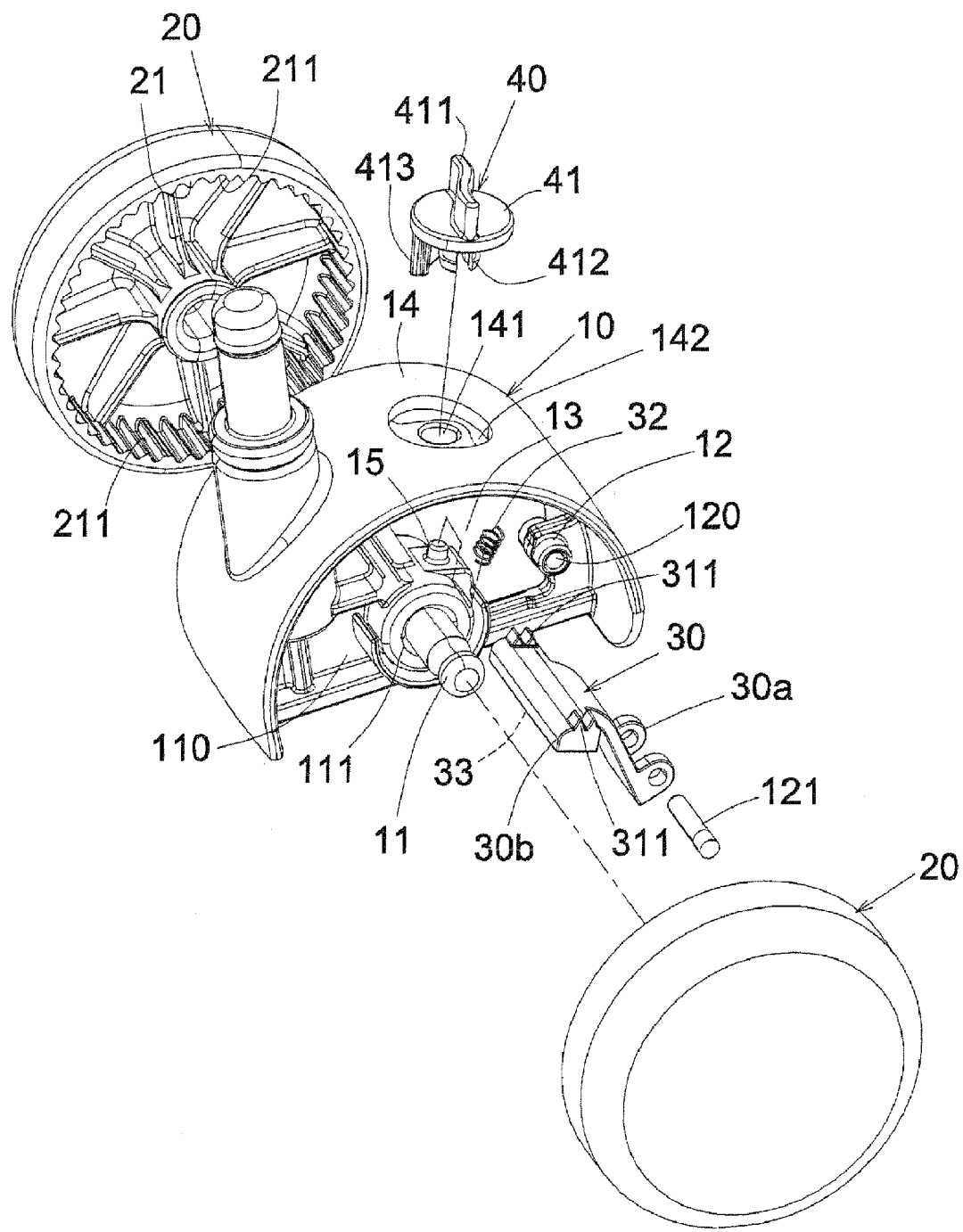
FIG. 1 is an exploded view showing a caster according to the present invention.
Figure 2:
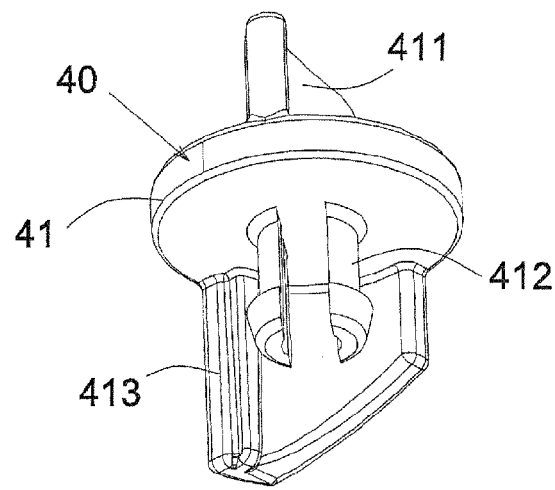
FIG. 2 is a bottom-side perspective view showing a release knob of the caster according to the present invention.
Figure 3:
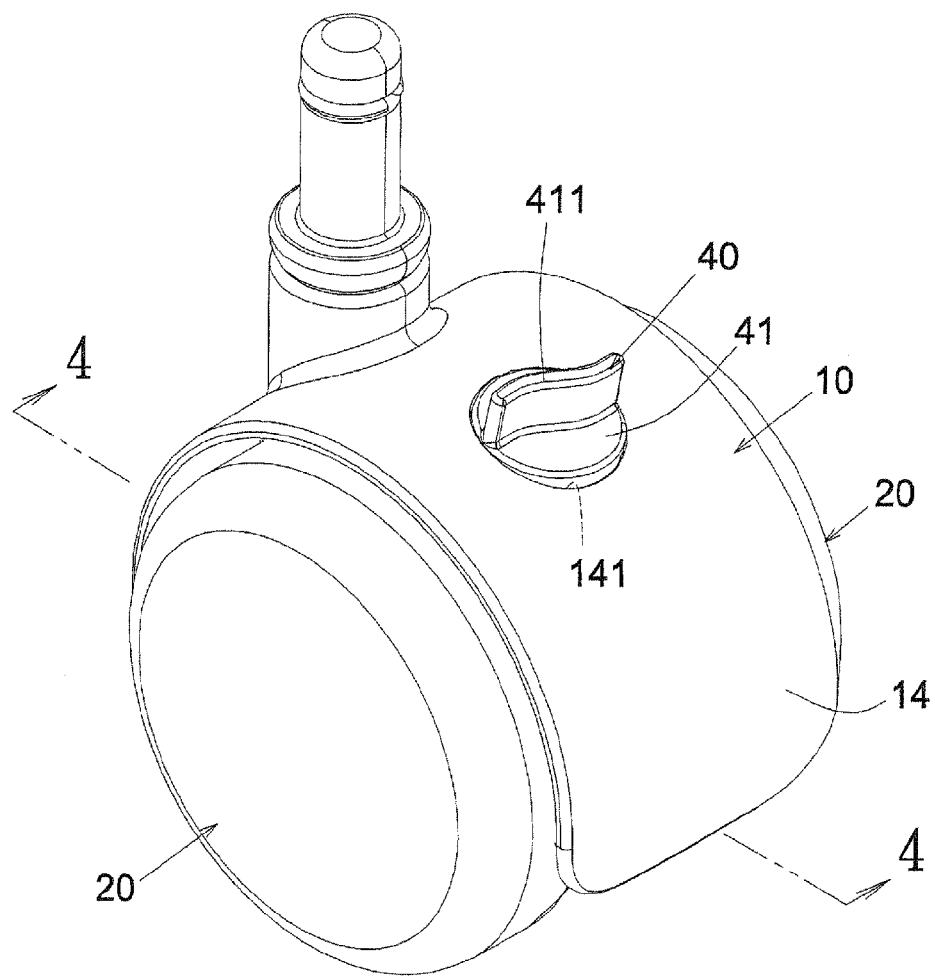
FIG. 3 is a perspective view showing the caster of the present invention in a locked condition.
Figure 4:
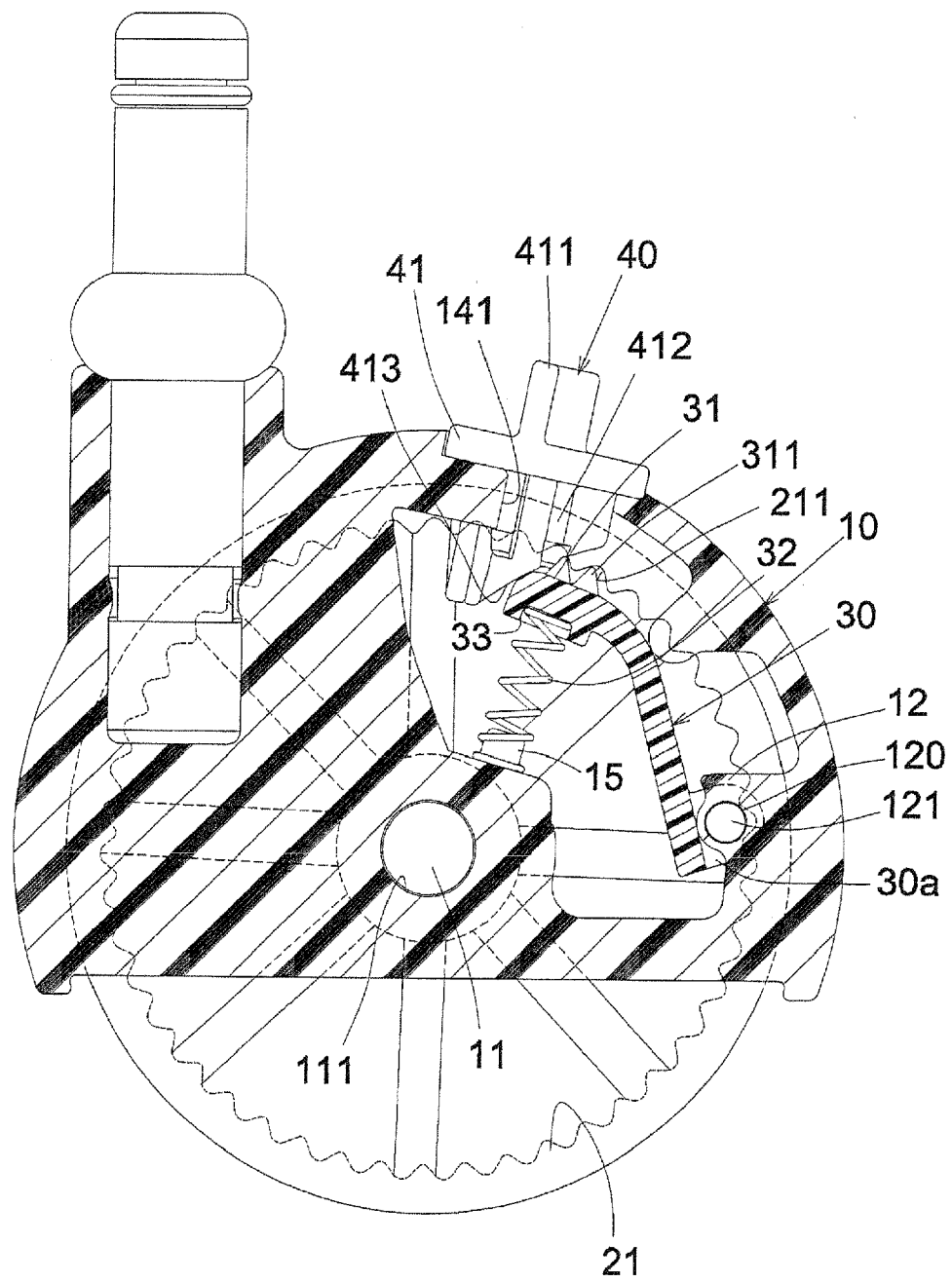
FIG. 4 is a cross-sectional view taken along line 4-4 of FIG. 3.
Figure 5:
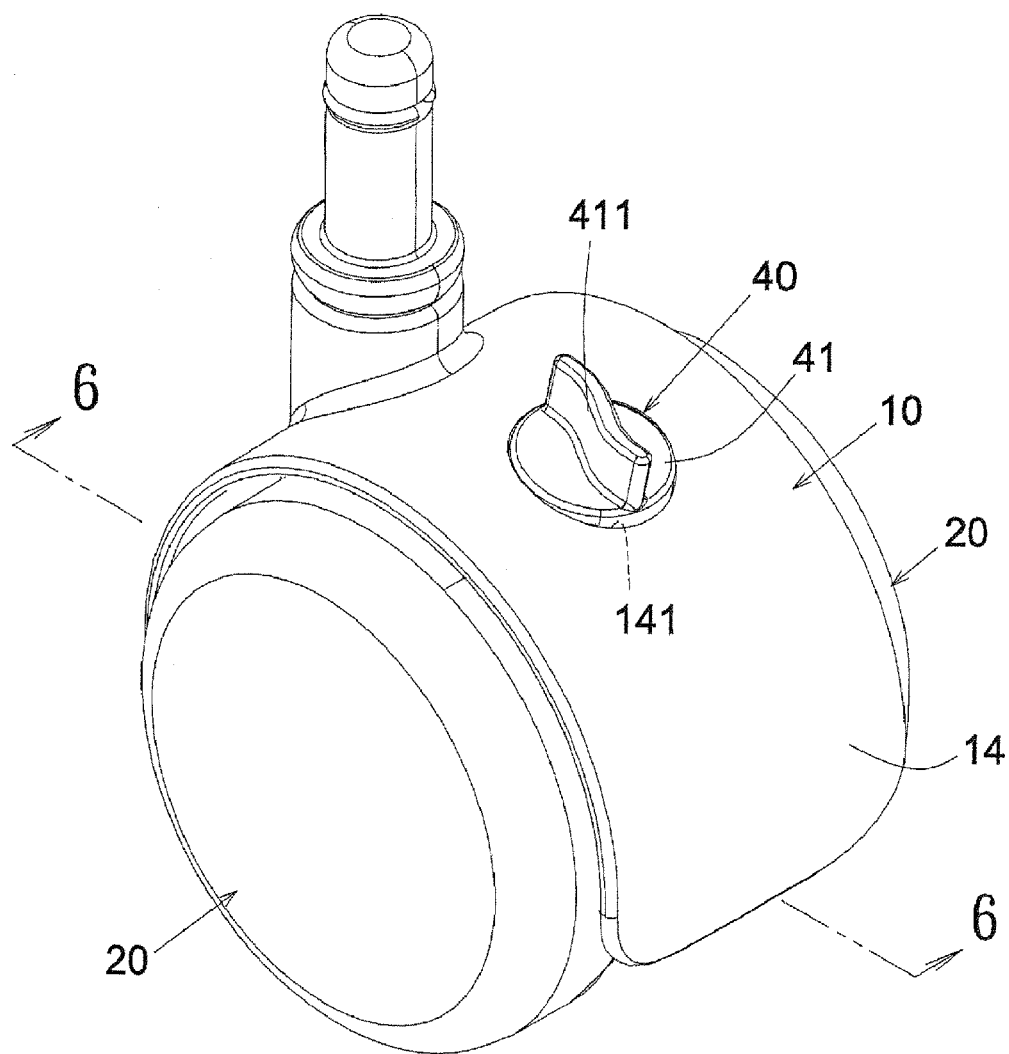
FIG. 5 is a perspective view of the caster of the present invention, showing the release knob in a released condition.
Figure 6:
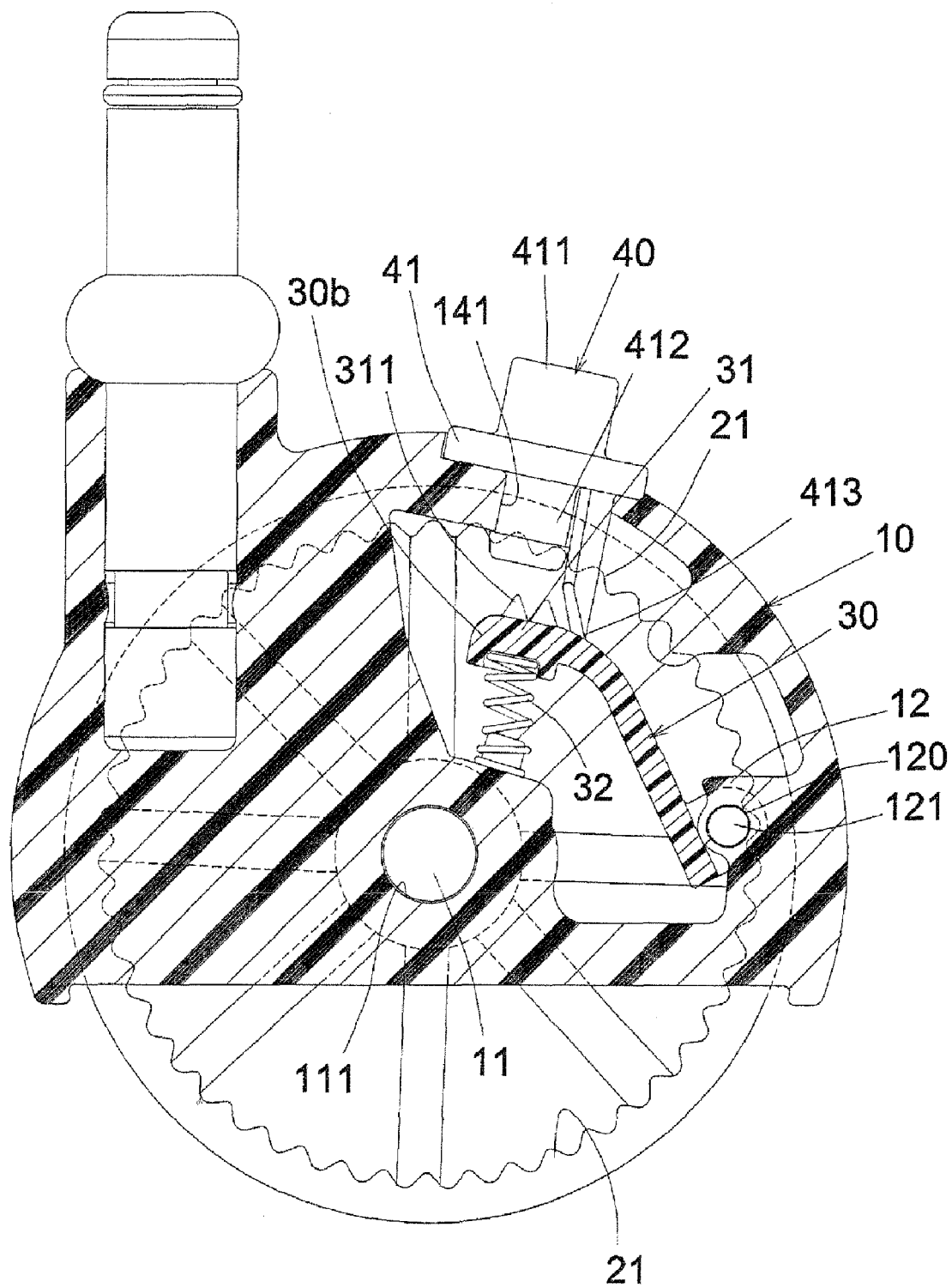
FIG. 6 is a cross-sectional view taken along line 6-6 of FIG. 5.

Referring to FIGS. 1-6, the present invention provides a structure of caster, which comprises a base 10, to which a rotation shaft 11 is mounted. The base 10 also forms a pivotal joint seat 12. Wheels 20 are rotatably mounted to the rotation shaft 11 of the base 10. Each of the wheels 20 has an inside surface that is recessed to form an inner rim 21. A brake arm 30 has a first end 30a rotatably coupled to the pivotal joint seat 12 of the base 10 and a second end 30b that forms a brake pawl 31 extending into the inner rims 21 of the wheels 20. A spring 32 is arranged between the brake arm 30 and the base 10 in such a way that the spring 32 normally biases the brake pawl 31 formed on the second end 30b of the brake arm 30 to depress against the inner rims 22 of the wheels 20 to brake the wheels 20 (as shown in FIGS. 3 and 4). A release knob 40 is rotatably mounted to the base 10 and comprises a cam section 413, which is positioned against the brake arm 30, whereby the cam section 413, when rotated by the release knob 40, drives the second end 30b of the brake arm 30 backward to release the brake pawl 31 of the brake arm 30 from the wheels 20, allowing the wheels 20 to freely rotate (as shown in FIGS. 5 and 6).

The caster of the present invention is applicable to a chair, a chest, a shelf, or a cart, but it is understood that the application of the caster of the present invention is not limited to these mentioned applications.

According to the caster of the present invention, the base 10 comprises a support board 110, in which a laterally extending shaft hole 111 is defined to receive and hold a central portion of the rotation shaft 11 therein so that opposite end portions of the rotation shaft 11 are exposed to respectively receive the wheels 20 rotatably mounted thereto. The support board 110 also forms the pivotal joint seat 12, which defines a pivot hole 120. A pivot pin 121 is received through the pivot hole 120 and the first end 30a of the brake arm 30. The support board 110 also forms an opening 13, through which the second end 30b of the brake arm 30 laterally extends to project into the inner rims 21 of the two wheels 20 located on two sides thereof. The support board 110 has an upper edge to which a hood 14 is mounted to shield the top of the wheels 20. The hood 14 forms a knob hole 141 therethrough for rotatably receiving and supporting an axle 412 of the release knob 40, and also forms an arc slot 142 about a center of the knob hole 141 and extending through the hood 14 for receiving the cam section 413 of the release knob 40 to extend therethrough.

As shown in FIGS. 1 and 4, according to the caster of the present invention, the base 10 comprises a spring support bar 15 and the brake arm 30 forms a receiving cavity 33. Opposite ends of the spring 32 are fit to and thus securely supported between the spring support bar 15 and the receiving cavity 33.

According to the caster of the present invention, the inner rim 21 of each wheel 20 has an inside surface that may be a smooth surface. Or alternatively, as shown in FIGS. 1 and 4, the inside surface of the inner rim 21 forms a plurality of troughs 211, which is circumferentially spaced with equal interval, and the brake pawl 31 of the brake arm 30 forms teeth 311 corresponding to the troughs, so that the teeth 311 of the brake arm 30 are engageable with the troughs 211 of the wheel 20 to arrest rotation of the wheel 20.

As shown in FIGS. 1 and 2, according to the caster of the present invention, the release knob 40 comprises a disc 41, which has a first surface on which a rib projection 411 is formed to allow a user to apply a force thereto for rotating the release knob 40 and an opposite second surface from which the axle 412 extends to be rotatably received in the knob hole 141 of the base 10. The cam section 413 is also formed on and extends from the second surface of the disc 41 in such a way that a lower edge of the cam section 413 is positioned against the brake arm 30. As illustrated in FIGS. 5 and 6, the cam section 413 is structured so that when the release knob 40 is rotated by an angle, the cam section 413 drives the brake arm 30 backward, disengaging the brake pawl 31 from the wheels 20, by which an operation of releasing the wheels 20 is realized. As illustrated in FIGS. 3 and 4, when a user rotates the release knob 40 to a different angle, the cam section 413 releases the brake arm 30, and the brake arm 30 is acted upon by the spring force of the spring 32 to make the brake pawl 31 of the brake arm 30 engaging the inner rims 21 of the wheels 20 and thus braking the wheels 20, by which a locking operation of the wheels is realized.

According to the caster of the present invention, the features of structure are that through rotation of the release knob 40, the brake arm 30 is caused to backward retract, so that the brake arm 30 no longer brakes the wheels 20 and a release operation is realized to allow free rotation of the wheels 20. On the other hand, through rotation of the release knob 40 in a different way, the cam section 413 is caused to release the brake arm 30, allowing the brake pawl 31 of the brake arm 30 to be biased by the spring force of the spring 32 to resiliently position against the wheels 20 and thus brake the wheels 20, whereby the wheels 20 are not allowed to freely rotate and a locking operation is realized. According to the present invention, whether the wheels 20 are arrested is determined by the rotation of the release knob 30, and thus, the operation is simple and also effortless. Further, undesired release of the wheels caused by external forces, improper handling and treading, or entangling external objects, which leads to unexpected movement of the caster, can be effectively avoided.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A caster, comprising:
   a base, to which a rotation shaft is mounted, the base forming a pivotal joint seat and defining a knob hole;
   wheels, which are rotatably mounted to the rotation shaft of the base, each of the wheels having an inside surface that is recessed to form an inner rim;
   a brake arm, which has a first end rotatably coupled to the pivotal joint seat of the base and a second end forming a brake pawl extending into the inner rims of the wheels, a spring being arranged between the brake arm and the base in such a way that the spring normally biases the brake pawl formed on the second end of the brake arm to depress against the inner rims of the wheels to brake the wheels; and
   a release knob, which is rotatably mounted in the knob hole of the base and comprises a cam section, which is positioned against the brake arm, whereby the cam section, when rotated by the release knob, drives the second end of the brake arm backward to release the brake pawl of the brake arm from the wheels so as to allow the wheels to freely rotate.

2. The caster according to claim 1, wherein the base comprises a support board, in which a laterally extending shaft hole is defined to receive and hold a central portion of the rotation shaft therein, opposite end portions of the rotation shaft respectively receiving the wheels rotatably mounted thereto, the support board forming the pivotal joint seat, which defines a pivot hole, a pivot pin being received through the pivot hole and the first end of the brake arm, the support board forming an opening, through which the second end of the brake arm laterally extends to project into the inner rims of the two wheels located on two sides thereof.

3. The caster according to claim 2, wherein the support board has an upper edge to which a hood is mounted to shield the wheels, the hood forming the knob hole therethrough for rotatably mounting the release knob and also forming an arc slot about a center of the knob hole for receiving the cam section of the release knob to extend therethrough.

4. The caster according to claim 1, wherein the base comprises a spring support bar and the brake arm forms a receiving cavity the spring having opposite ends respectively fit to and securely supported between the spring support bar and the receiving cavity.

5. The caster according to claim 1, wherein the inner rim of each of the wheels has a smooth inside surface.

6. The caster according to claim 1, wherein the inner rim of each of the wheels forms a plurality of troughs, which is circumferentially spaced with equal interval, the brake pawl of the brake aim forming teeth corresponding to the troughs, the teeth of the brake arm being engageable with the troughs of the wheels to arrest rotation of the wheels.

7. The caster according to claim 1, wherein the release knob comprises a disc, which has a first surface on which a rib projection is formed and an opposite second surface from which an axle extends to be rotatably received in the knob hole of the base, the cam section being formed on and extending from the second surface of the disc in such a way that a lower edge of the cam section is positioned against the brake arm.

* * * * *